United States Patent
Nakamura

(10) Patent No.: US 10,238,189 B2
(45) Date of Patent: Mar. 26, 2019

(54) WEARING BAND FOR ELECTRONIC DEVICE AND ELECTRONIC DEVICE

(71) Applicant: FUJITSU LIMITED, Kawasaki-shi, Kanagawa (JP)

(72) Inventor: Yutaka Nakamura, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/707,204

(22) Filed: Sep. 18, 2017

(65) Prior Publication Data

US 2018/0000206 A1   Jan. 4, 2018

Related U.S. Application Data

(63) Continuation of application No. PCT/JP2015/061901, filed on Apr. 17, 2015.

(51) Int. Cl.
*A41F 9/00*     (2006.01)
*A44C 5/00*    (2006.01)
(Continued)

(52) U.S. Cl.
CPC .............. *A44C 5/027* (2013.01); *A44C 5/003* (2013.01); *A44C 5/0023* (2013.01);
(Continued)

(58) Field of Classification Search
CPC .... A44C 5/04; A44C 5/06; A44C 5/08; A44C 5/0069; A44C 5/0076; A44C 5/0023;
(Continued)

(56) References Cited

U.S. PATENT DOCUMENTS

| 149,824 A   | * | 4/1874 | Baker et al. ....................... 245/6 |
| 2,110,872 A | * | 3/1938 | Forstner ................... A41F 9/002 2/339 |

(Continued)

FOREIGN PATENT DOCUMENTS

| EP | 1911366 A1 | * | 4/2008 | ............... A44C 5/06 |
| EP | 1911366 A1 |   | 4/2008 | |

(Continued)

OTHER PUBLICATIONS

International Search Report for International Application No. PCT/JP2015/061901 dated Jul. 7, 2015.

*Primary Examiner* — Jack W Lavinder
(74) *Attorney, Agent, or Firm* — Kratz, Quintos & Hanson, LLP

(57) ABSTRACT

A wearing band including plural first zigzag springs and plural second zigzag springs. The plural first zigzag springs have axial directions in a length direction of a band body that is formed in a belt shape or a ring shape. The plural first zigzag springs are arrayed in the length direction and a width direction of the band body so as to form a section stretching and contracting in the length direction of the band body. The plural second zigzag springs have axial directions in the width direction of the band body and are arrayed in the length direction and the width direction of the band body so as to form a section stretching and contracting in the width direction of the band body. The plural second zigzag springs have a spring constant different to a spring constant of the plural first zigzag springs.

15 Claims, 20 Drawing Sheets

(51) Int. Cl.
*A44C 5/02* (2006.01)
*A44C 15/00* (2006.01)
*B33Y 80/00* (2015.01)

(52) U.S. Cl.
CPC ............ *A44C 5/0069* (2013.01); *B33Y 80/00* (2014.12); *A41F 9/002* (2013.01); *A44C 15/006* (2013.01)

(58) Field of Classification Search
CPC ....... A44C 5/003; A44C 5/027; A44C 15/006; Y10T 24/4782; A61M 29/02; B33Y 80/00; A41F 9/002
See application file for complete search history.

(56) References Cited

U.S. PATENT DOCUMENTS

| | | | |
|---|---|---|---|
| 5,016,305 | A | 5/1991 | Suenens |
| 2004/0102834 | A1 | 5/2004 | Nakano |
| 2009/0193591 | A1 | 8/2009 | Demoss |
| 2010/0311544 | A1 | 12/2010 | Robinette |
| 2013/0337978 | A1 | 12/2013 | Robinette |
| 2015/0127286 | A1 | 5/2015 | Capozzi |
| 2016/0349077 | A1 | 12/2016 | Capozzi |

FOREIGN PATENT DOCUMENTS

| | | | | |
|---|---|---|---|---|
| FR | 2097429 | A5 * | 3/1972 | ........... A44C 5/0076 |
| JP | 2000-000025 | U | 3/2000 | |
| JP | 2000-279215 | A | 10/2000 | |
| JP | 2002-61691 | A | 2/2002 | |
| JP | 2002-233578 | A | 8/2002 | |
| JP | 2011-510793 | A | 4/2011 | |
| JP | 2013-143997 | A | 7/2013 | |
| JP | 2014-181416 | A | 9/2014 | |
| JP | 2015-57100 | A | 3/2015 | |

* cited by examiner

WEARING BAND FOR ELECTRONIC DEVICE AND ELECTRONIC DEVICE

CROSS-REFERENCE TO RELATED APPLICATION

This application is a continuation application of International Application No. PCT/JP2015/061901, filed on Apr. 17, 2015, the disclosure of which is incorporated herein by reference in its entirety.

FIELD

The technology disclosed herein relates to a wearing band for a wearable electronic device and an electronic device.

BACKGROUND

Various wearable electronic devices, such as wristwatches and bracelets, have recently been proposed (for example, see Patent Document 1).

RELATED PATENT DOCUMENTS

Patent Document 1: Japanese Patent Application Laid-Open (JP-A) No. 2015-57100
Patent Document 2: JP-A No. 2002-61691
Patent Document 3: Japanese Utility Model Application Laid-Open (JP-U) No. 2000-25
Patent Document 4: Japanese National Phase Publication No. 2011-510793

SUMMARY

An object of one aspect of technology disclosed herein is to provide a wearing band for an electronic device that is capable of improving comfort when worn on the body of a person.

One aspect of technology disclosed herein is a wearing band for an electronic device, the wearing band including plural first zigzag springs and plural second zigzag springs. The plural first zigzag springs have axial directions in a length direction of a band body that is formed in a belt shape or a ring shape and are arrayed in the length direction and a width direction of the band body so as to form a section stretching and contracting in the length direction of the band body. The plural second zigzag springs have axial directions in the width direction of the band body and are arrayed in the length direction and the width direction of the band body so as to form a section stretching and contracting in the width direction of the band body. The plural second zigzag springs have a spring constant different to a spring constant of the plural first zigzag springs.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

First Exemplary Embodiment

First, explanation follows regarding a first exemplary embodiment of technology disclosed herein.

Figure 1:
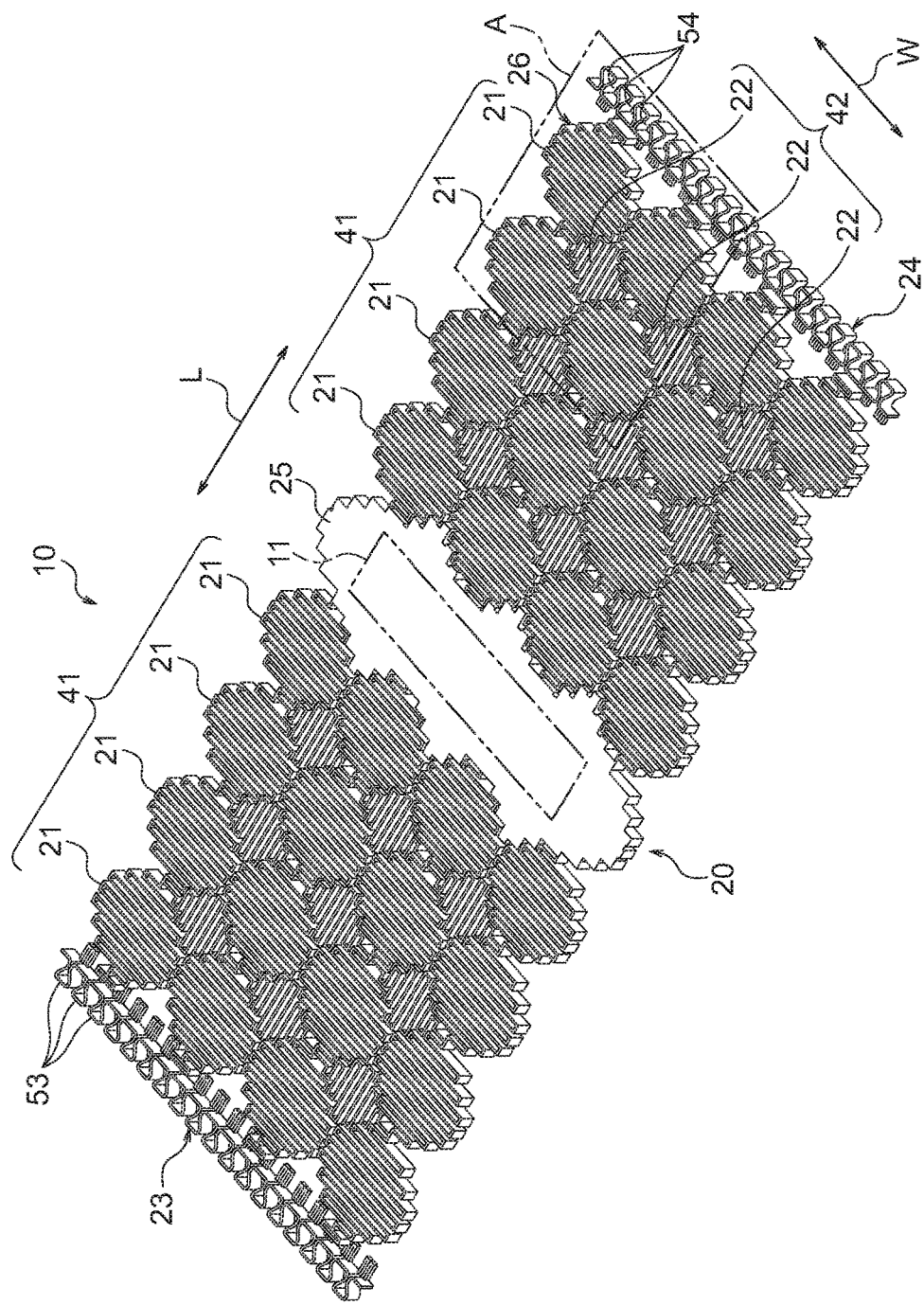
FIG. 1 is a perspective view of an electronic device provided with a wearing band according to a first exemplary embodiment.

An electronic device 10 according to the first exemplary embodiment illustrated in FIG. 1 is a wearable electronic device, and includes a wearing band 20 and an electronic device body 11.

The wearing band 20 is, for example, a band that is worn on a predetermined location of the body of a person, such as the arm, the waist, or the head. The wearing band 20 is formed in a belt shape with its length direction in an L direction and its width direction in a W direction. The wearing band 20 includes plural first zigzag springs 21, plural second zigzag springs 22, a connection section 23, a connected section 24, and a mounting section 25.

The plural first zigzag springs 21, the plural second zigzag springs 22, the connection section 23, the connected section 24, and the mounting section 25 form a band body 26 of the wearing band 20. The plural first zigzag springs 21, the plural second zigzag springs 22, the connection section 23, the connected section 24, and the mounting section 25 form the wearing band 20 of the first exemplary embodiment. Thus, in the first exemplary embodiment, the wearing band 20 is synonymous with the band body 26.

The plural first zigzag springs 21 and the plural second zigzag springs 22 are arrayed in the L direction and the W direction. The W direction intersects (for example, is orthogonal to) the L direction.

Figure 2:
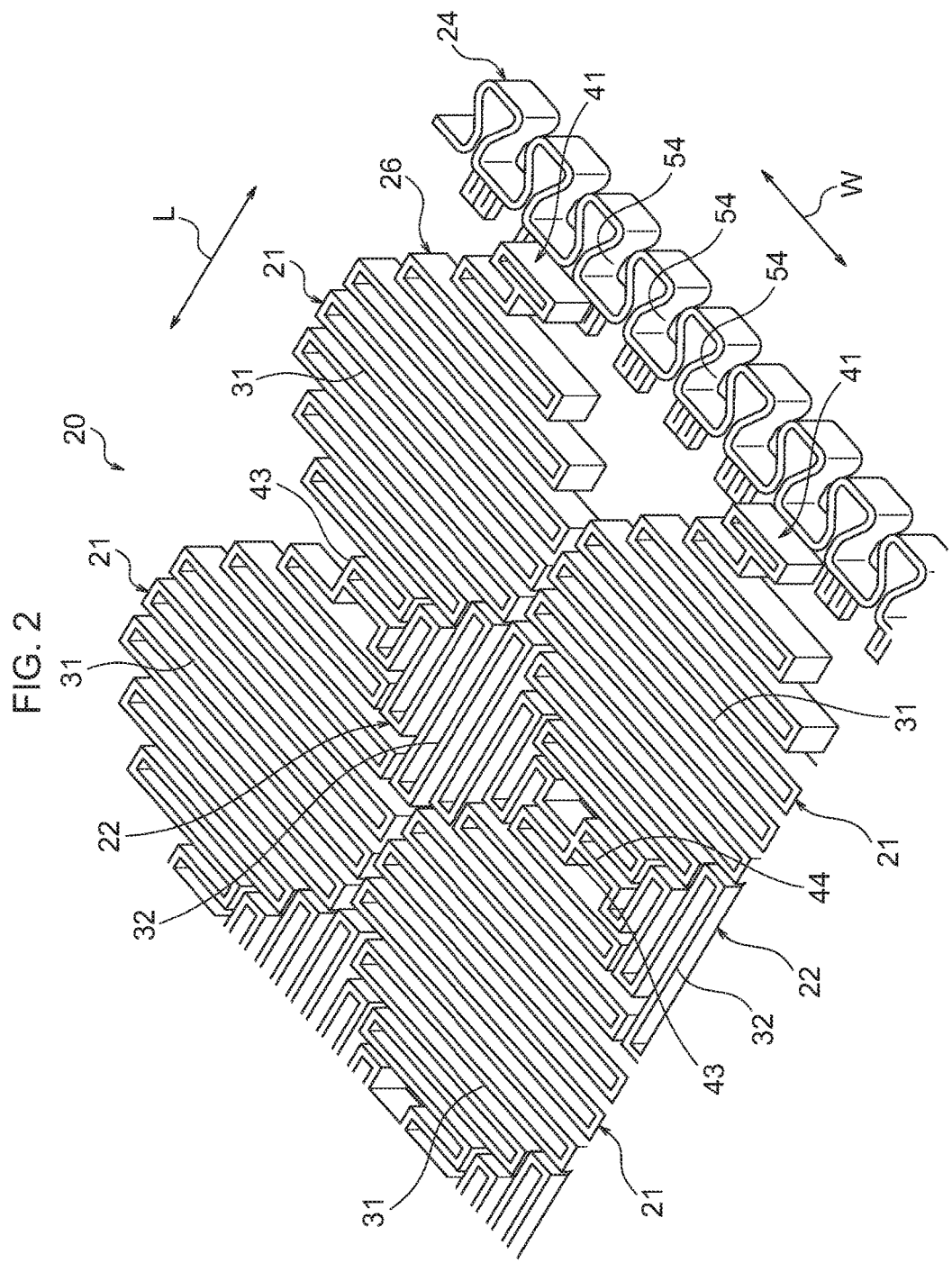
FIG. 2 is an enlarged view of section A of the wearing band illustrated in FIG. 1.

As illustrated in FIG. 2, each of the plural first zigzag springs 21 is formed having its axial direction in the L direction. Each of the plural first zigzag springs 21 includes plural S-shaped portions arranged along the L direction. The plural first zigzag springs 21 form a section stretching and contracting in the length direction of the wearing band 20 (the band body 26).

On the other hand, each of the plural second zigzag springs 22 is formed having its axial direction in the W direction. Each of the plural second zigzag springs 22 includes plural S-shaped portions arranged along the W direction. The plural second zigzag springs 22 form a section stretching and contracting in the width direction of the wearing band 20 (the band body 26).

Note that in the first zigzag springs 21, the plural S-shaped portions arranged along the L direction may also be understood to be plural crank-shaped portions arranged along the L direction. Similarly, in the second zigzag springs 22, the plural S-shaped portions arranged along the W direction may also be understood to be plural crank-shaped portions arranged along the W direction.

Figure 3:
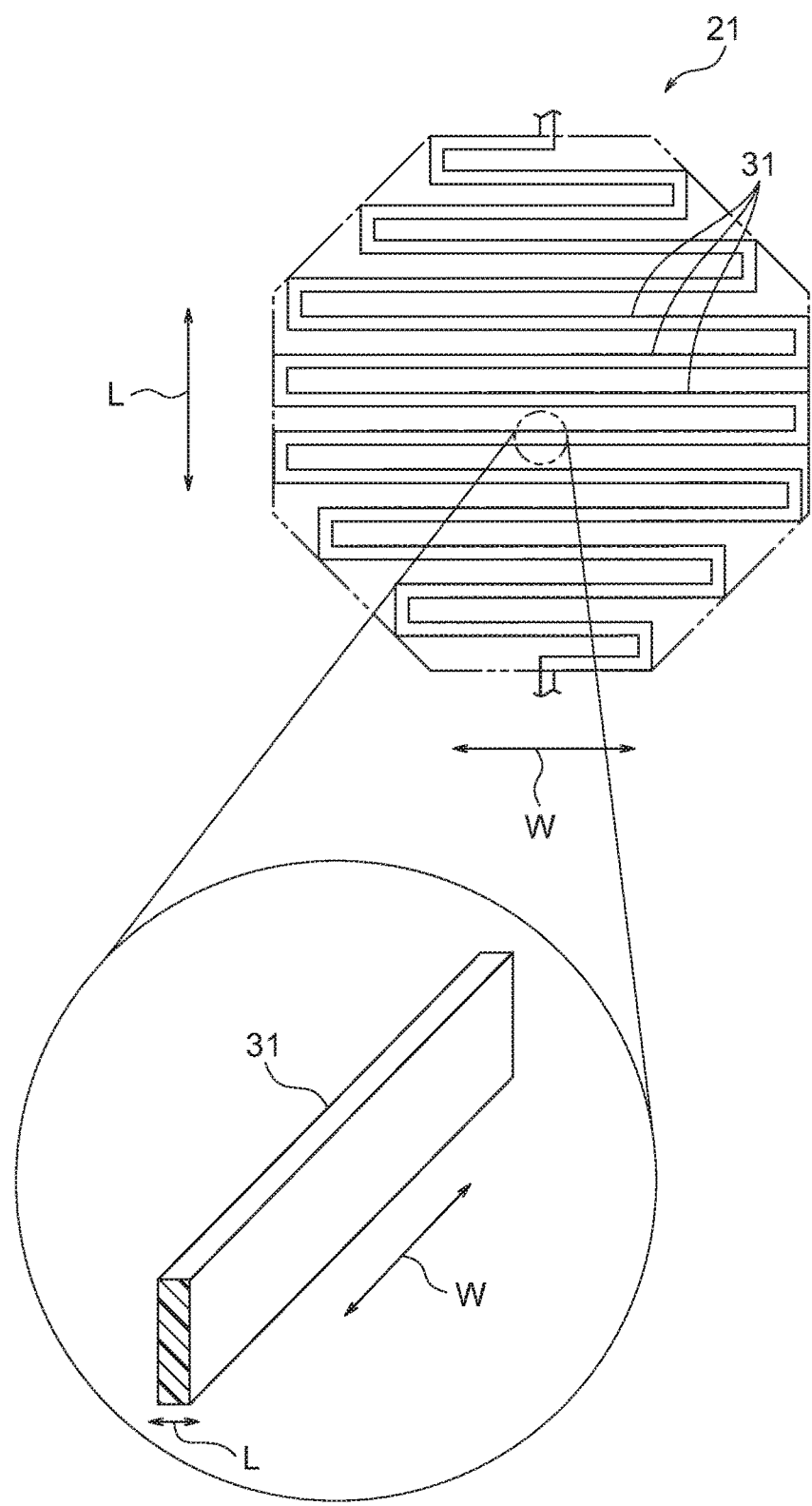
FIG. 3 is an enlarged view of a first zigzag spring illustrated in FIG. 1.

As illustrated in FIG. 3, each of the first zigzag springs 21 has a substantially regular octagonal shaped outline profile in plan view. Namely, each first zigzag spring 21 has plural line elements 31 extending in the W direction and arranged alongside each other in the L direction. Length direction end portions of the plural line elements 31 are linked together to form each first zigzag spring 21 in a substantially regular octagonal shape. Each line element 31 is formed in a plate shape with its plate thickness direction in the L direction.

Figure 4:
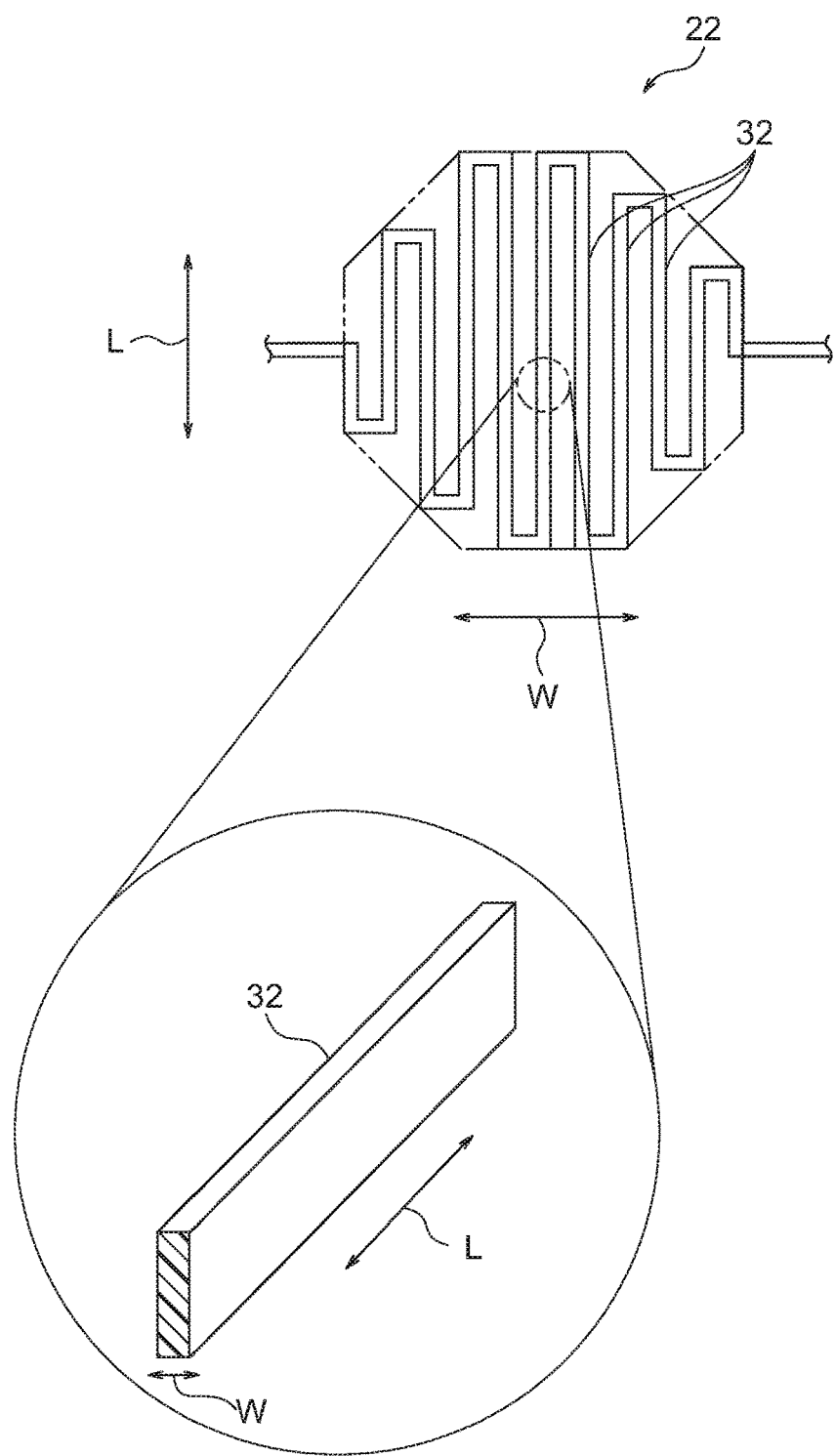
FIG. 4 is an enlarged view of a second zigzag spring illustrated in FIG. 1.

Similarly, as illustrated in FIG. 4, each of the second zigzag springs 22 has a substantially regular octagonal shaped outline profile in plan view. Namely, each second zigzag spring 22 has plural line elements 32 extending in the L direction and arranged alongside each other in the W direction. Length direction end portions of the plural line elements 32 are linked together to form each second zigzag spring 22 in a substantially regular octagonal shape. Each line element 32 is formed in a plate shape with its plate thickness direction in the W direction. The line elements 31 of the first zigzag springs 21 and the line elements 32 of the second zigzag springs 22 are formed having the same plate thickness as each other.

Moreover, as illustrated in FIG. 2, the size (the lateral width and the length) of the first zigzag springs 21 is larger than that of the second zigzag springs 22. Further, due to the first zigzag springs 21 having a larger size than the second zigzag springs 22, the first zigzag springs 21 have a smaller spring constant (deform more readily) than the second zigzag springs 22. Due to the first zigzag springs 21 having a larger size (smaller spring constant) than the second zigzag springs 22, the wearing band 20 illustrated in FIG. 1 is thus anisotropic in that the wearing band 20 stretches more readily in the L direction than in the W direction.

Figure 5:
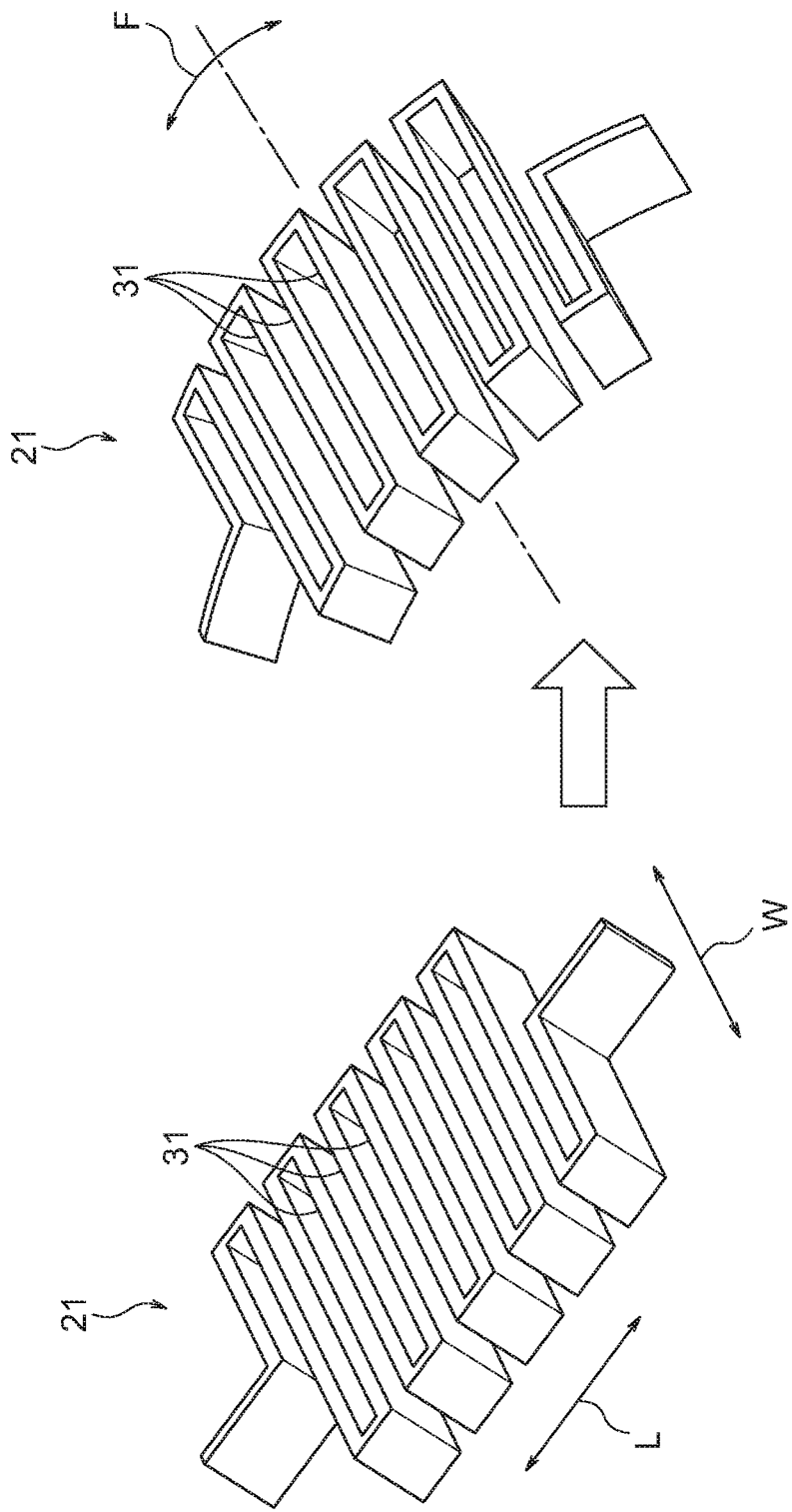
FIG. 5 is a schematic diagram for explaining properties of the first zigzag spring illustrated in FIG. 1.
Figure 6:
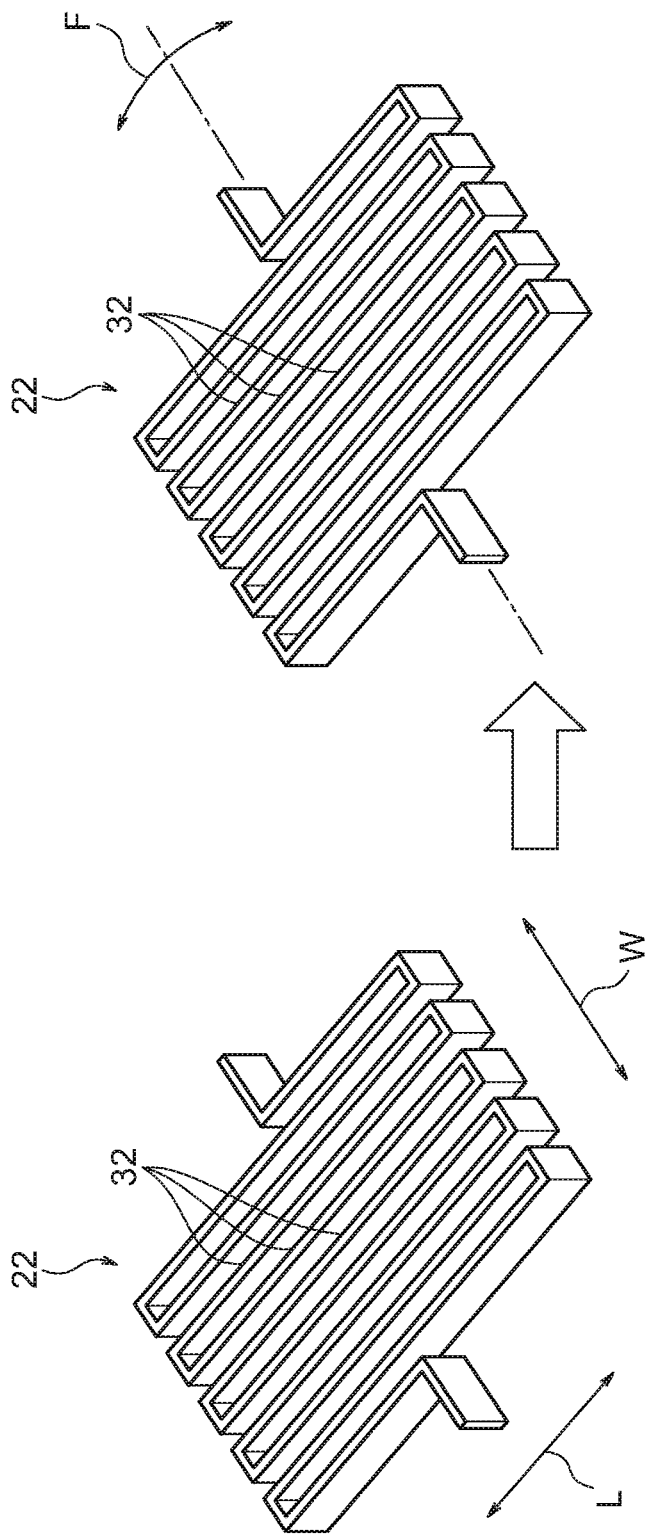
FIG. 6 is a schematic diagram for explaining properties of the second zigzag spring illustrated in FIG. 1.

Further, as illustrated in FIG. 5, the line elements 31 of the first zigzag spring 21 extend in the W direction and are arranged alongside each other in the L direction, such that tensile and bending load F causes the first zigzag spring 21 to stretch readily in the L direction and to bend readily about an axis parallel to the W direction. On the other hand, as illustrated in FIG. 6, the line elements 32 of the second zigzag spring 22 extend in the L direction and are arranged alongside each other in the W direction, such that even when applied with tensile and bending load F, the second zigzag spring 22 does not readily stretch in the L direction and does not readily bend about an axis parallel to the W direction. In the wearing band 20 illustrated in FIG. 1, the size of each first zigzag spring 21 is larger than that of each second zigzag spring 22, and so the wearing band 20 has the property of readily bending about an axis parallel to the W direction.

Figure 7:
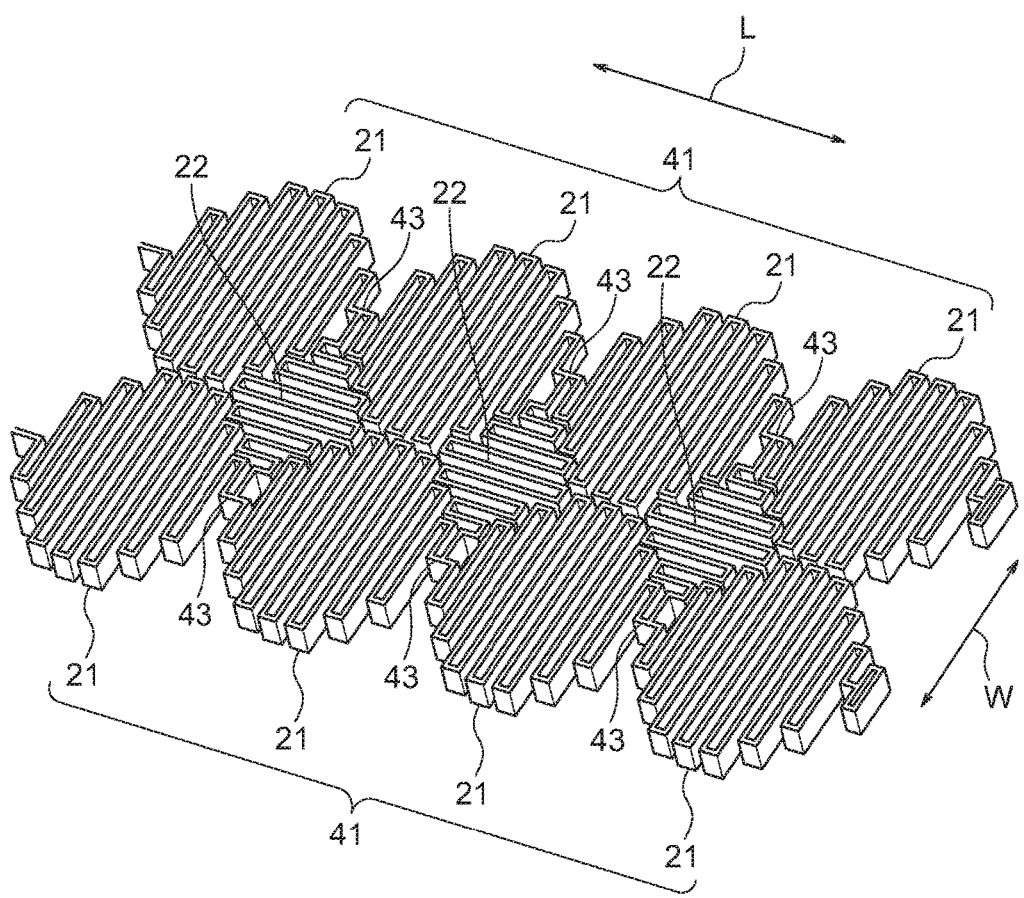
FIG. 7 is an enlarged view of a structure illustrated in FIG. 1, in which one first spring row and another first spring row are coupled together by second zigzag springs.

The plural first zigzag springs 21 and the plural second zigzag springs 22 used to achieve such a property are more specifically arrayed as follows. Namely, as illustrated in FIG. 7, the plural first zigzag springs 21 form plural first spring rows 41 that each include plural of the first zigzag springs 21 arranged along the L direction. The plural first spring rows 41 are arranged alongside each other in the W direction. Coupling portions 43 are formed between adjacent first zigzag springs 21 in each first spring row 41.

Figure 8:
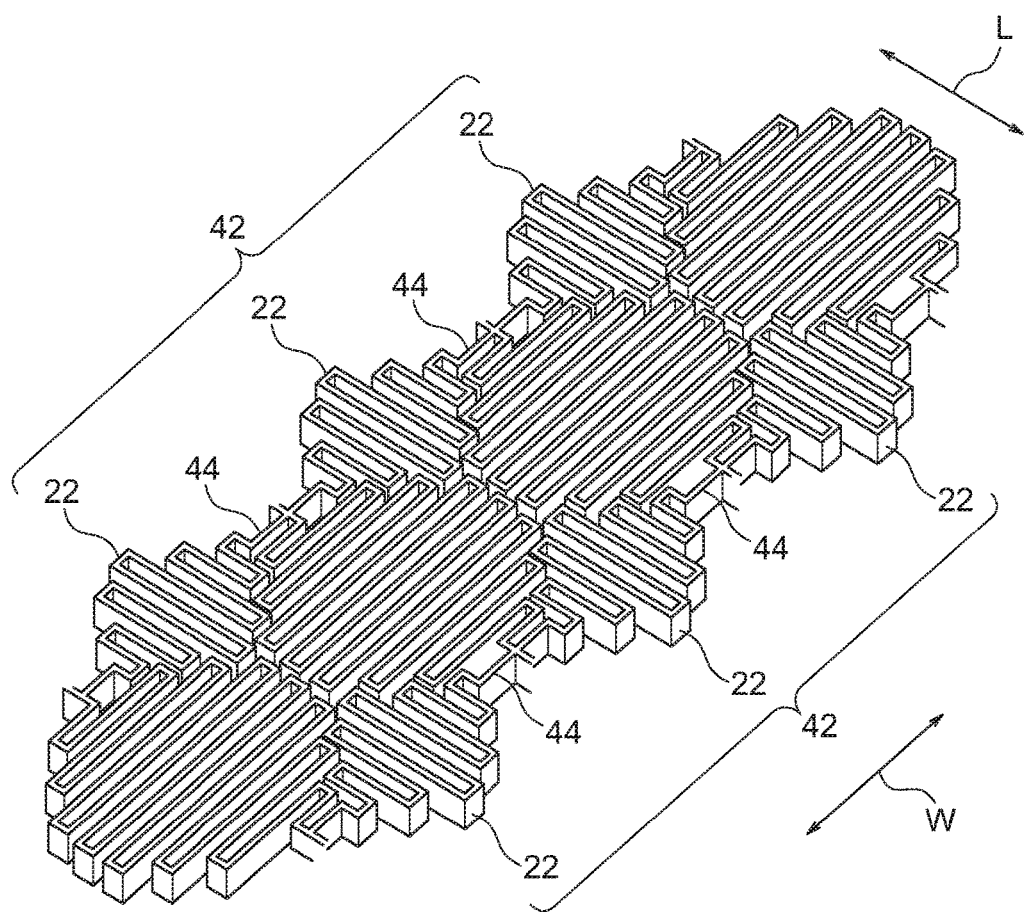
FIG. 8 is an enlarged view of a structure illustrated in FIG. 1, in which one second spring row and another second spring row are coupled together by first zigzag springs.

On the other hand, as illustrated in FIG. 8, the plural second zigzag springs 22 form plural second spring rows 42 that each include plural second zigzag springs 22 arranged along the W direction. The plural second spring rows 42 are arranged alongside each other in the L direction. Coupling portions 44 are formed between adjacent second zigzag springs 22 in each second spring row 42.

Further, as illustrated in FIG. 7, each the plural second zigzag springs 22 couples a coupling portion 43 of one first spring row 41 out of the plural first spring rows 41 to a coupling portion 43 of another first spring row 41 that is adjacent to the one first spring row 41. As illustrated in FIG. 2, the coupling portions 43 and the coupling portions 44 are connected to each other in cross shapes.

By being arrayed as described above, the plural first zigzag springs 21 and the plural second zigzag springs 22 are formed in the same single plane extending in the L direction and the W direction. Further, by forming the plural first zigzag springs 21 and the plural second zigzag springs 22 in the same single plane extending in the L direction and the W direction, the wearing band 20 is formed in a plate shape.

As illustrated in FIG. 1, the connection section 23 is formed at one length direction end of the wearing band 20, and includes plural protrusions 53 arranged alongside each other in the W direction. On the other hand, the connected section 24 is formed at the other length direction end of the wearing band 20, and includes plural recesses 54 arranged alongside each other in the W direction. The connection section 23 is connected to the connected section 24 by fitting the plural protrusions 53 into the respective plural recesses 54. Further, the wearing band 20 is formed into a ring shape (tube shape) with its peripheral direction in the L direction by connecting the connection section 23 to the connected section 24. The wearing band 20 is able to return to a belt shape by releasing the connection between the connection section 23 and the connected section 24.

The mounting section 25, for example, is formed at a length direction central section of the wearing band 20. The mounting section 25 is formed in an elongated shape with its short direction in the L direction and its length direction in the W direction. The mounting section 25 is formed in a plate shape and is formed from a hard material. The plural first zigzag springs 21 and the plural second zigzag springs 22 are arrayed at both L direction sides of the mounting section 25.

The plural first zigzag springs 21, the plural second zigzag springs 22, the connection section 23, the connected section 24, and the mounting section 25 described above are integrally formed to the wearing band 20. The wearing band 20 is formed of a resin, for example. In cases in which the wearing band 20 is formed of a resin, the wearing band 20 may be manufactured using, for example, a three-dimensional printer, resin molding, or a processing method such as punching.

The electronic device body 11 is mounted to the mounting section 25. The electronic device body 11 is, for example, configured by an electronic unit including a sensor, a computation element, a storage element, a battery, a display device, an operation switch, a casing, and the like. Note that a semiconductor chip may be employed as the electronic device body 11.

The electronic device 10 configured as described above is, for example, used as follows. Namely, in FIG. 9, the electronic device 10 is a wristband type wearable device, and the wearing band 20 is worn on the wrist of a user. Further, in FIG. 10, the electronic device 10 is a waist-belt type wearable device, and the wearing band 20 is worn on the waist of a user. Moreover, in FIG. 11, the electronic device 10 is a headband type wearable device, and the wearing band 20 is worn on the head of a user.

Figure 9:
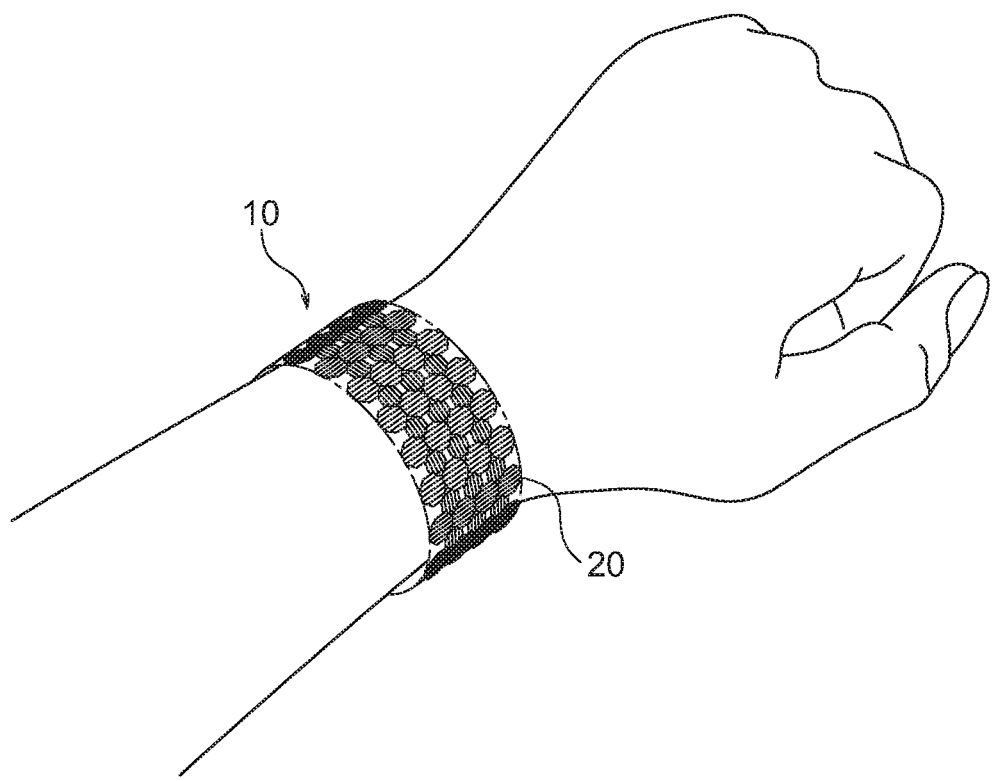
FIG. 9 is a diagram illustrating an electronic device according to the first exemplary embodiment in a state worn on the wrist.
Figure 10:
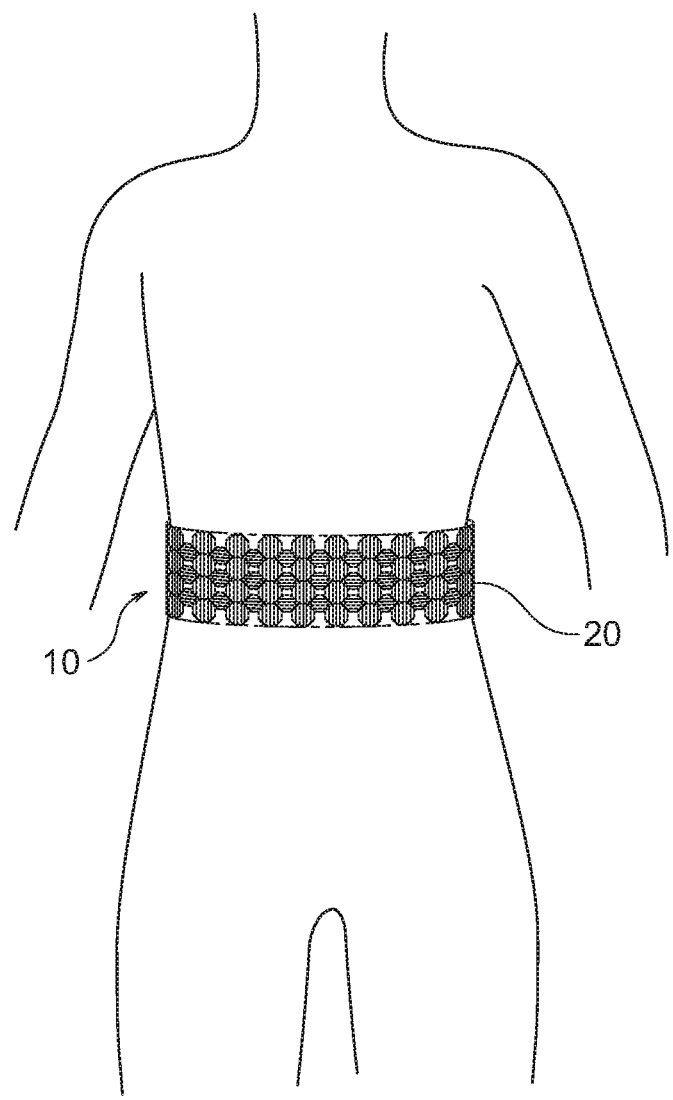
FIG. 10 is a diagram illustrating an electronic device according to the first exemplary embodiment in a state worn on the waist.
Figure 11:
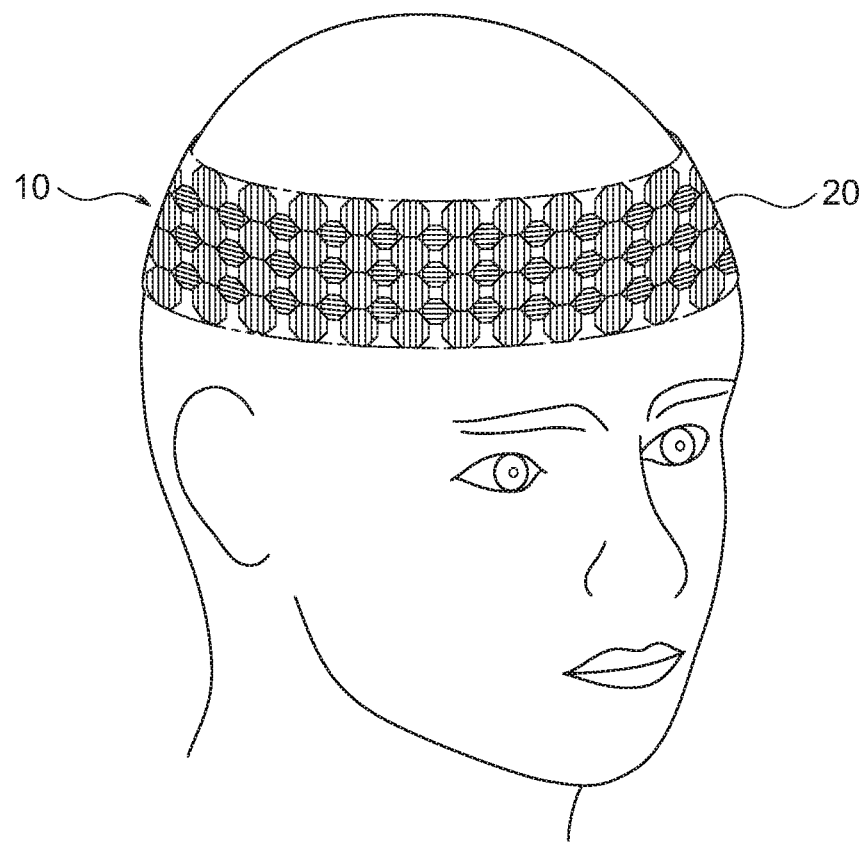
FIG. 11 is a diagram illustrating an electronic device according to the first exemplary embodiment in a state worn on the head.

The electronic device 10 is not limited to the examples of usage illustrated in FIG. 9 to FIG. 11, and the electronic device 10 may be of a type worn on a location of the body other than those described above, such as a ring type or a bracelet type. The length and width of the wearable band 20 are set appropriately in accordance with its location on the body, this being where the wearing band 20 is to be worn.

Explanation follows regarding operation and advantageous effects of the first exemplary embodiment.

According to the first exemplary embodiment as described above, the wearing band 20 includes the plural first zigzag springs 21 and the plural second zigzag springs 22 as illustrated in FIG. 1, and is thus made lightweight. Moreover, the first zigzag springs 21 having axial directions in the length direction of the wearing band 20 have a larger size (smaller spring constant) than the second zigzag springs 22 having axial directions in the width direction of the wearing band 20.

Thus, when the wearing band 20 is worn on the body, the wearing band 20 stretches readily in the length direction (peripheral direction) and the wearing band 20 bends readily about an axis parallel to the width direction. Further, the wearing band 20 also stretches in the width direction because of the second zigzag springs 22, such that even complicated undulations in the body can be accommodated. Thus, the wearing band 20 is not uncomfortable when worn on the body, since the wearing band 20 is flexible and conforms well to the complicated shape of the body. This enables the comfort of the wearing band 20 when worn on the body to be improved.

The wearing band 20 is formed in a belt shape, the connection section 23 is formed at one length direction end of the wearing band 20, and the connected section 24 connected to the connection section 23 is formed at the other length direction end of the wearing band 20. The wearing band 20 can thereby be formed into a ring shape (tube shape) by connecting the connection section 23 to the connected section 24.

Moreover, since the wearing band 20 readily stretches in the length direction (peripheral direction), the wearing band 20 can be put on the body (for example, on the wrist) in the ring shape as-is. This enables the convenience of the wearing band 20 to be improved, since there is no need to fasten and unfasten a belt, such as with the band of a wristwatch.

Further, in a state in which the connection section 23 and the connected section 24 are not connected to each other, the wearing band 20 has a belt shape (flat face shape). Thus, the wearing band 20 can be manufactured in a belt shaped state such that the wearing band 20 is easy to manufacture, and moreover, as long as the wearing band 20 is placed in the belt shape when not in use, the wearing band 20 has the advantage of being easy to store.

Further, the plural first zigzag springs 21 and the plural second zigzag springs 22 are formed in the same single plane extending in the length direction and the width direction of the wearing band 20. The wearing band 20 is thus configured in a plate shape. Accordingly, bulkiness of the wearing band 20 can be suppressed by making the wearing band 20 thin, enabling the comfort of the wearing band 20 when worn on the body to be further improved.

Further, as illustrated in FIG. 7, the plural first zigzag springs 21 form the plural first spring rows 41 including plural of the first zigzag springs 21 arranged along the length direction of the wearing band 20. On the other hand, as illustrated in FIG. 8, the plural second zigzag springs 22 form the plural second spring rows 42 including plural of the second zigzag springs 22 arranged along the width direction of the wearing band 20. Further, as illustrated in FIG. 7, each of the plural second zigzag springs 22 couples a coupling portion 43 of one first spring row 41 out of the plural first spring rows 41 to a coupling portion 43 of another first spring row 41 that is adjacent to the one first spring row 41.

The plural first zigzag springs 21 and the plural second zigzag springs 22 can thereby be disposed in a dense arrangement by arraying the plural first zigzag springs 21 and the plural second zigzag springs 22 as described above. This enables the space efficiency of the wearing band 20 to be improved.

Further, as illustrated in FIG. 1, the hard mounting section 25 is provided to the wearing band 20 separately from the plural first zigzag springs 21 and the plural second zigzag springs 22. Thus, the electronic device body 11 that is weak with respect to bending can be mounted to the mounting section 25, enabling failure of or damage to the electronic device body 11 to be suppressed.

Explanation follows regarding a modified example of the first exemplary embodiment.

Although the wearing band 20 is formed in a belt shape (see FIG. 1) in the first exemplary embodiment described above, the wearing band 20 may be formed in a ring shape (see FIG. 9 to FIG. 11). As a method for forming the wearing band 20 into a ring shape, for example, the wearing band 20 is manufactured in a belt shape and then the two length direction ends of the wearing band 20 are joined together by welding, adhesion, or the like as a method to configure the wearing band 20 into a ring shape.

Figure 12:
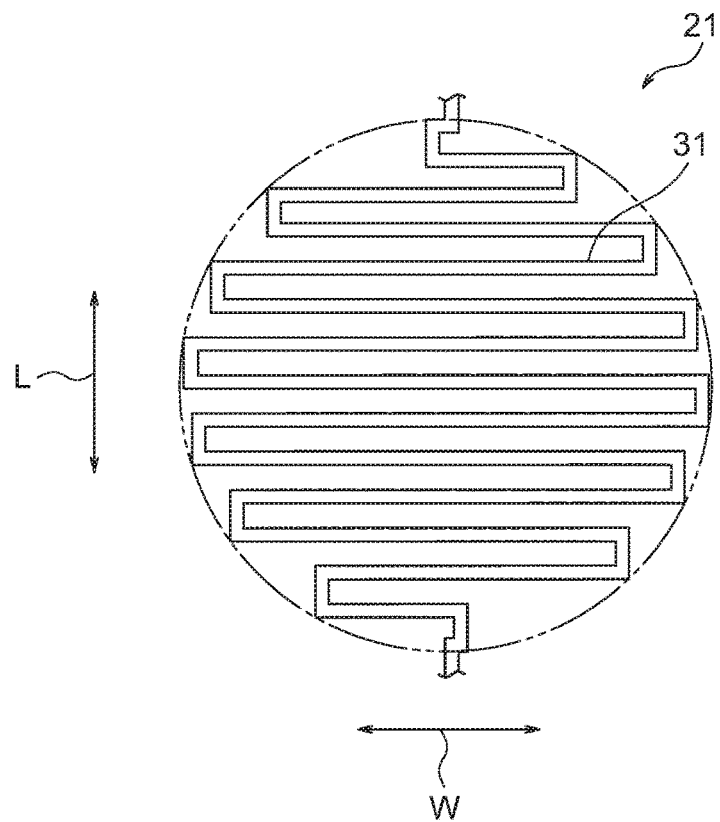
FIG. 12 is a diagram illustrating a modified example of the first zigzag spring illustrated in FIG. 1.

Further, each of the first zigzag springs 21 has a substantially regular octagon shaped outline profile in plan view (see FIG. 3). However, as illustrated in FIG. 12, the outline profiles of the first zigzag springs 21 may be configured by substantially circular shapes in plan view. Similarly, each of the second zigzag springs 22 has a substantially regular octagon shaped outline profile in plan view (see FIG. 4).

Figure 13:
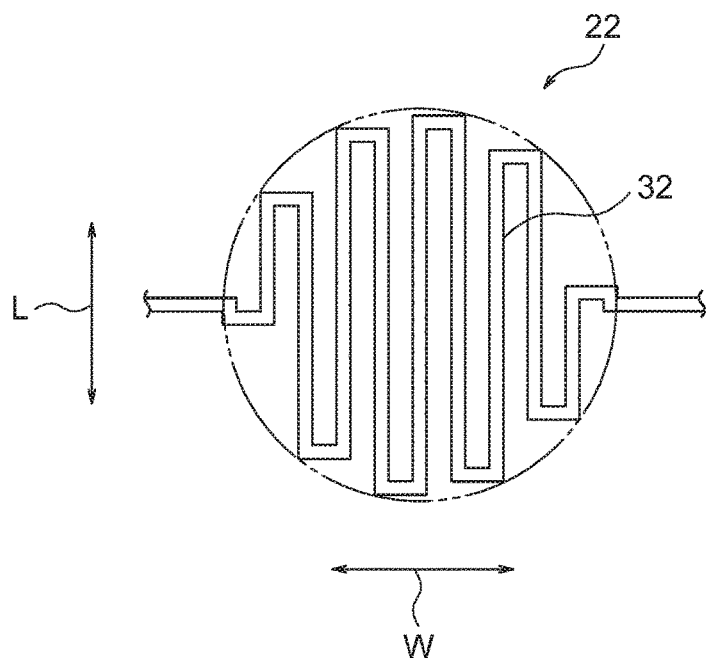
FIG. 13 is a diagram illustrating a modified example of the second zigzag spring illustrated in FIG. 1.

However, as illustrated in FIG. 13, the outline profiles of the second zigzag springs 22 may be configured by substantially circular shapes in plan view.

Figure 14:
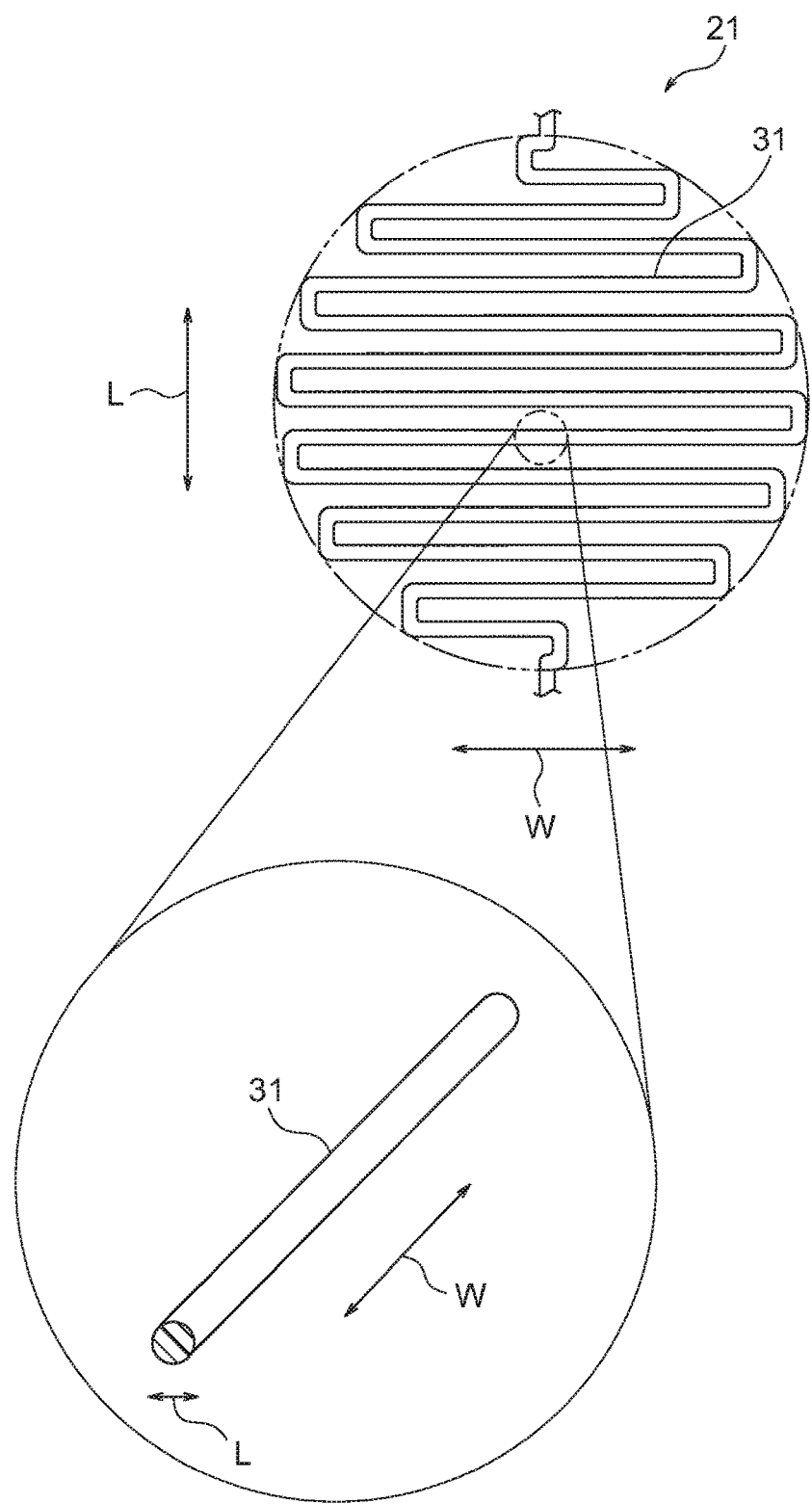
FIG. 14 is a diagram illustrating another modified example of the first zigzag spring illustrated in FIG. 1.
Figure 15:
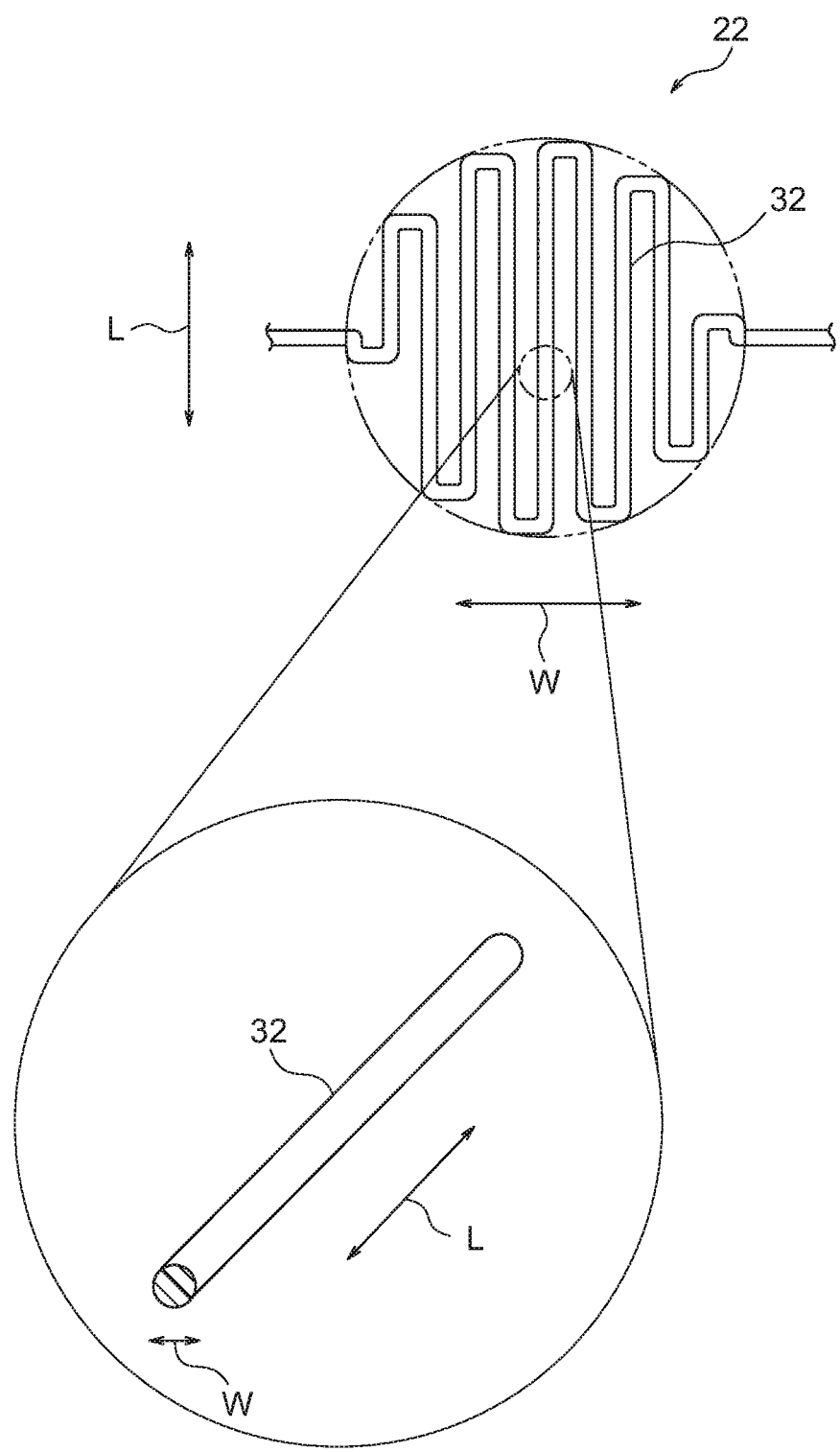
FIG. 15 is a diagram illustrating another modified example of the second zigzag spring illustrated in FIG. 1.

Further, the line elements 31 forming the first zigzag springs 21 are flat plate shaped (see FIG. 3). However, as illustrated in FIG. 14, the line elements 31 forming the first zigzag springs 21 may be rounded rod shaped. Similarly, the line elements 32 forming the second zigzag spring 22 are flat plate shaped (see FIG. 4). However, as illustrated in FIG. 15, the line elements 32 forming the second zigzag spring 22 may be rounded rod shaped.

The size of the first zigzag springs 21 is larger than that of the second zigzag springs 22, and so the spring constant of the first zigzag springs 21 is smaller than that of the second zigzag springs 22. However, the size of the first zigzag springs 21 may be configured to be smaller than or the same as the size of the second zigzag springs 22 so long as the spring constant of the first zigzag springs 21 is smaller than the spring constant of the second zigzag springs 22.

Second Exemplary Embodiment

Explanation follows regarding a second exemplary embodiment of technology disclosed herein.

Figure 16:
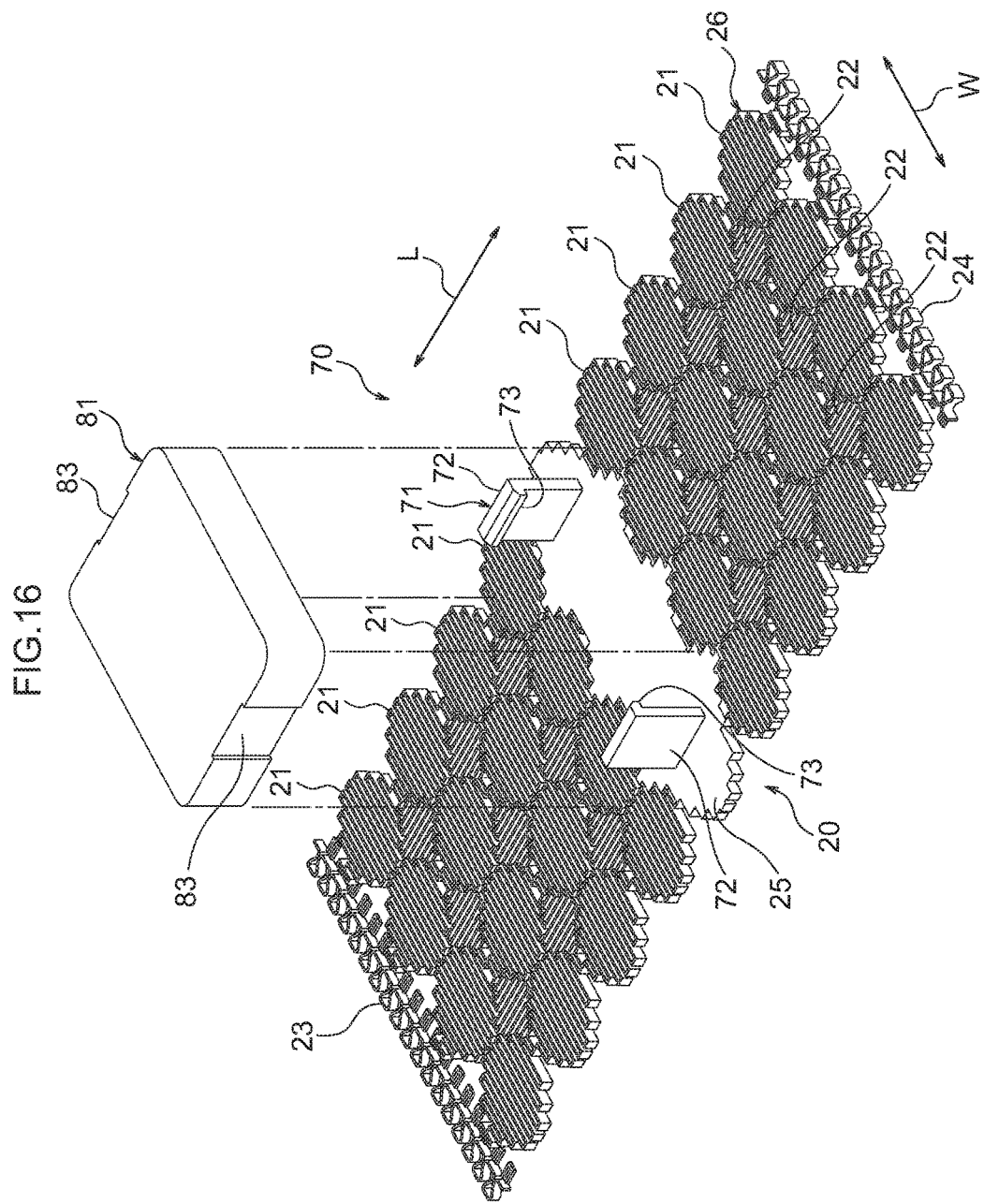
FIG. 16 is a diagram illustrating an electronic device body of an electronic device according to a second exemplary embodiment, in a state removed from a mounting section.
Figure 17:
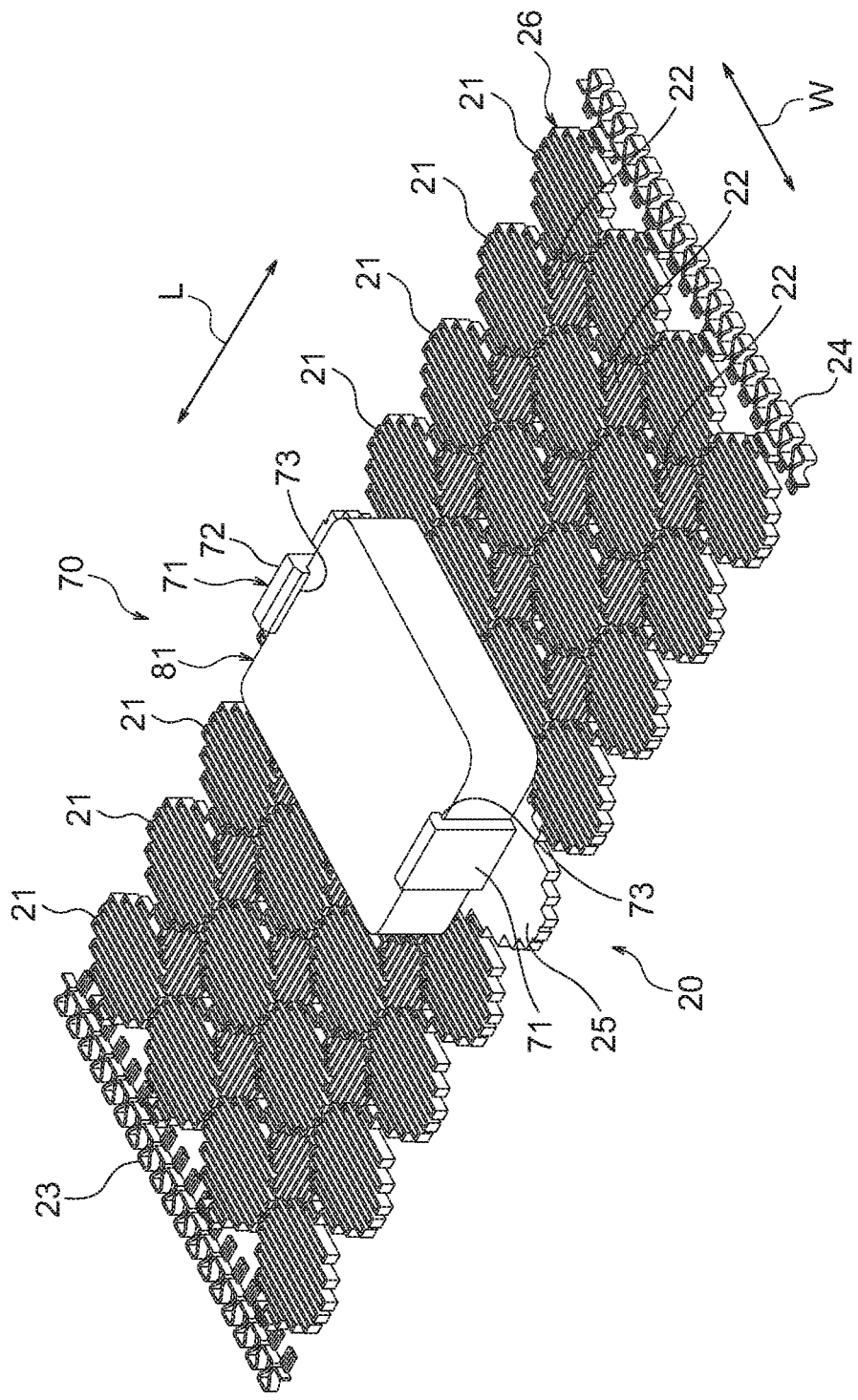
FIG. 17 is a diagram illustrating an electronic device body of the electronic device illustrated in FIG. 16, in a state attached to a mounting section.

An electronic device 70 according to the second exemplary embodiment illustrated in FIG. 16 and FIG. 17 has a structure modified from that of the electronic device 10 (see FIG. 1) according to the first exemplary embodiment described above as follows.

Namely, a wearing band 20 of the electronic device 70 according to the second exemplary embodiment includes a detachment section 71 in addition to the band body 26. The detachment section 71 includes a mounting section 25, and an electronic device body 81 is attached to and detached from the detachment section 71. The detachment section 71 includes, as an example, a pair of arm portions 72. The pair of arm portions 72 project out in a direction normal to the front surface of the mounting section 25. Hook portions 73 projecting out toward the inside of the pair of arm portions 72 are formed at leading end portions of the pair of arm portions 72.

Further, the electronic device 70 includes the electronic device body 81 configured as a separate body from the mounting section 25. The electronic device body 81 is, for example, configured by an electronic unit including a sensor, a computation element, a storage element, a battery, a display device, an operation switch, a casing, and the like. When the electronic device body 81 is mounted to a predetermined location on the mounting section 25, the pair of arm portions 72 engage with groove portions 83 formed in side faces of the electronic device body 81 and the pair of hook portions 73 latch onto an upper face of the electronic device body 81, thereby fixing the electronic device body 81 to the mounting section 25.

On the other hand, when the electronic device body 81 is removed from the mounting section 25, for example, the pair of arm portions 72 elastically deform in a mutually separating direction, such that the electronic device body 81 is removed from between the pair of arm portions 72.

According to the second exemplary embodiment, the detachment section 71 which the electronic device body 81 is attached to and detached from is provided to the mounting section 25 of the wearing band 20 in this manner, enabling the convenience of the electronic device 70 to be improved.

Note that in the second exemplary embodiment, the pair of arm portions 72 may be tilted in the mutually separating direction by a release mechanism or the like to remove the electronic device body 81 from between the pair of arm portions 72.

Further, the detachment section 71 may have any structure, so long as attachment and detachment of the electronic device body 81 is enabled.

Third Exemplary Embodiment

Explanation follows regarding a third exemplary embodiment of technology disclosed herein.

Figure 18:
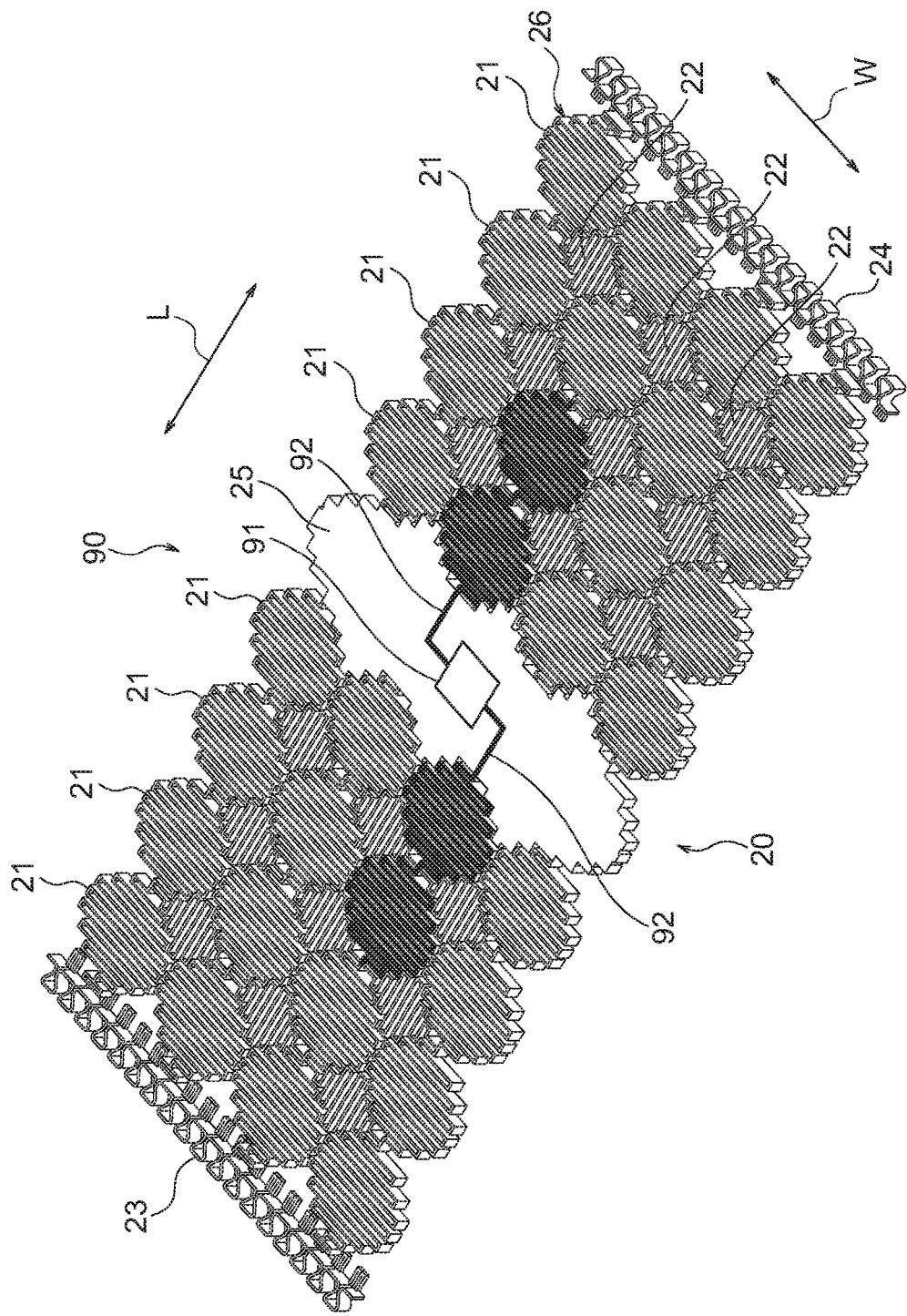
FIG. 18 is a perspective view of an electronic device according to a third exemplary embodiment.

An electronic device 90 according to the third exemplary embodiment illustrated in FIG. 18 has a structure modified from that of the electronic device 10 (see FIG. 1) according to the first exemplary embodiment described above as follows.

Namely, in the electronic device 90 according to the third exemplary embodiment, a semiconductor chip 91 is mounted to the mounting section 25. The semiconductor chip 91 is an example of an electronic device body. The semiconductor chip 91 may be packaged on the front surface of the mounting section 25, or may, for example, be embedded in the mounting section 25 using insert molding or the like.

Further, the wearing band 20 includes a pair of conductive patterns 92 in addition to the band body 26. Each conductive pattern 92 is formed on the band body 26 to the mounting section 25 and to several first zigzag springs 21 adjacent to the mounting section 25.

Each conductive pattern 92 is formed, for example, by a thin film or the like. Each conductive pattern 92 is configured by, for example, a circuit wire, an antenna, or the like, and is electrically connected to the semiconductor chip 91.

The portion of each conductive pattern 92 formed on the first zigzag springs 21 is formed in a zigzag shape running along the first zigzag springs 21. Note that the conductive patterns 92 may be formed on the front surface or the back surface of the mounting section 25 and the first zigzag springs 21, or may, for example, be embedded in the mounting section 25 and the first zigzag spring 21 by insert molding or the like.

According to the third exemplary embodiment, the conductive patterns 92 are thus integrally formed to the wearing band 20, enabling the structure of the wearing band 20 to be simplified in comparison to a case in which, for example, a conductive member separate to the wearing band 20 is employed. This enables the ease of use of the electronic device 90 to be improved.

Figure 19:
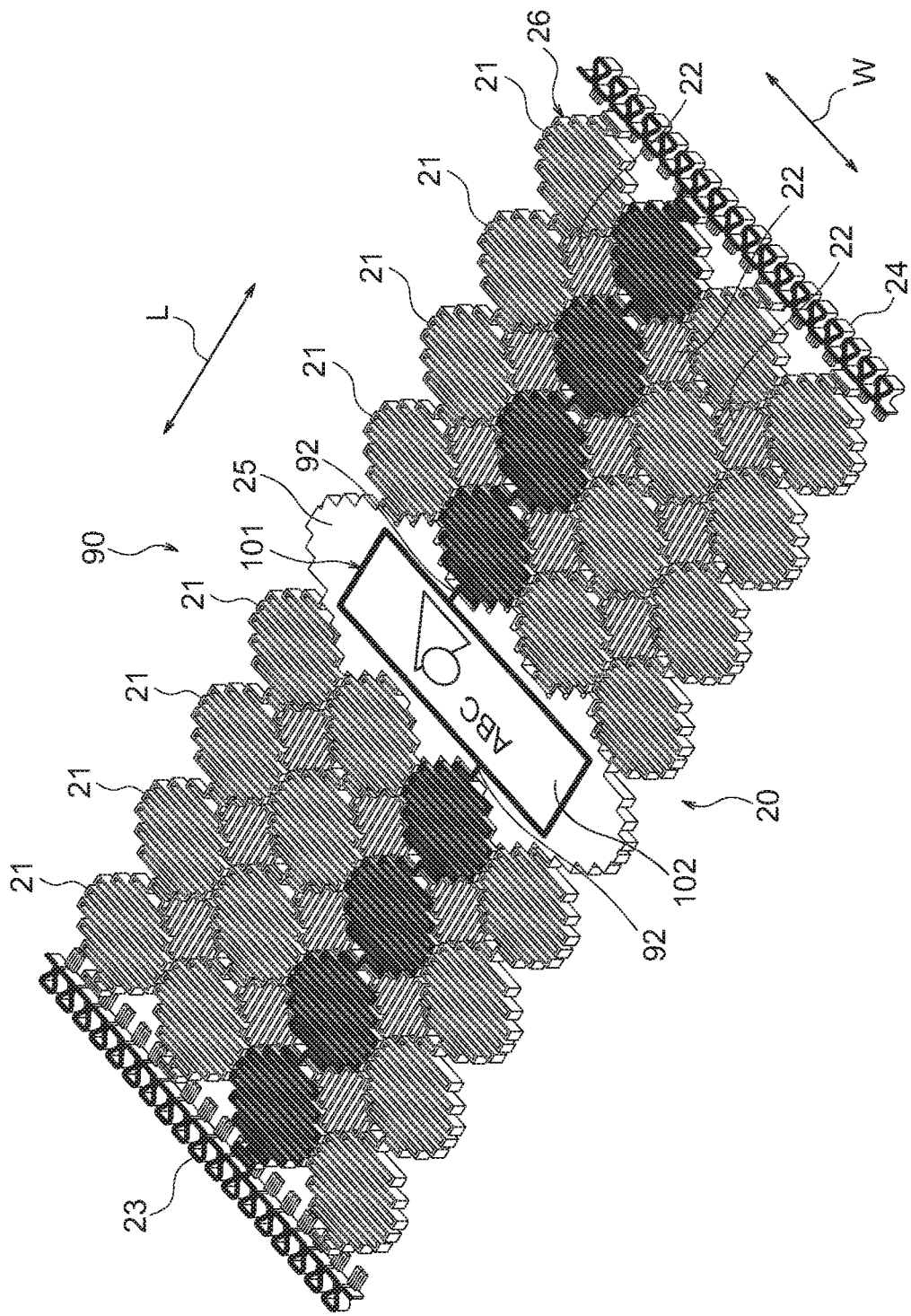
FIG. 19 is a diagram illustrating a modified example of an electronic device according to the third exemplary embodiment.

Note that as illustrated in FIG. 19, in the third exemplary embodiment, an electronic device body 101 including a display device 102 may be mounted to the mounting section 25.

Further, the conductive pattern 92 may be formed spanning the mounting section 25, the first zigzag springs 21, the connection section 23, and the connected section 24 of the band body 26. Moreover, the conductive pattern 92 may be formed to the second zigzag springs 22. The conductive pattern 92 is capable of being formed on any out of at least the mounting section 25, the first zigzag springs 21, the second zigzag springs 22, the connection section 23, and the connected section 24.

Further, the conductive pattern 92 may be applied to the wearing band 20 of the second exemplary embodiment (see FIG. 16 and FIG. 17) including the detachment section 71 described above.

Fourth Exemplary Embodiment

Explanation follows regarding a fourth exemplary embodiment of technology disclosed herein.

Figure 20:
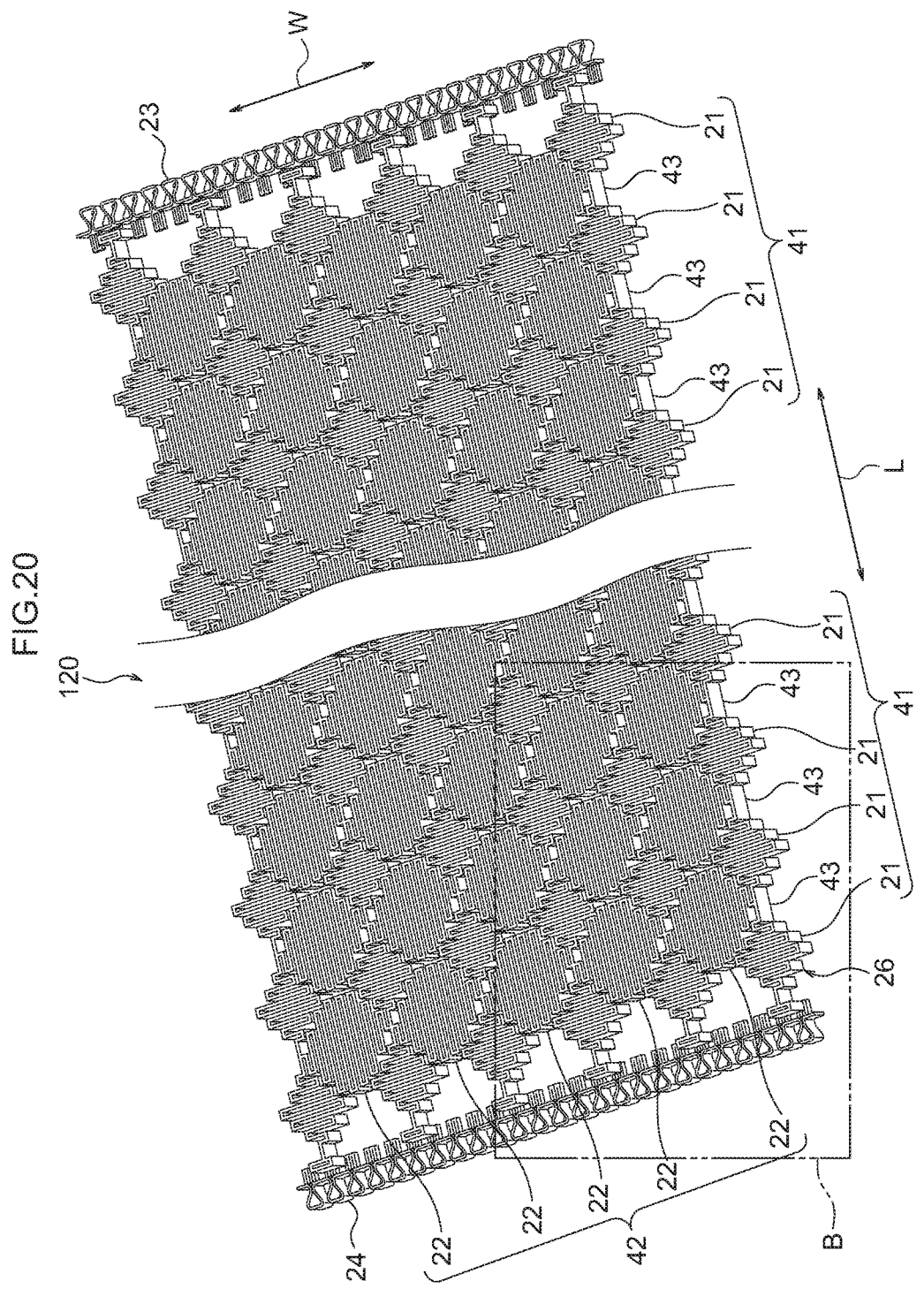
FIG. 20 is a perspective view of a wearing band according to a fourth exemplary embodiment.
Figure 21:
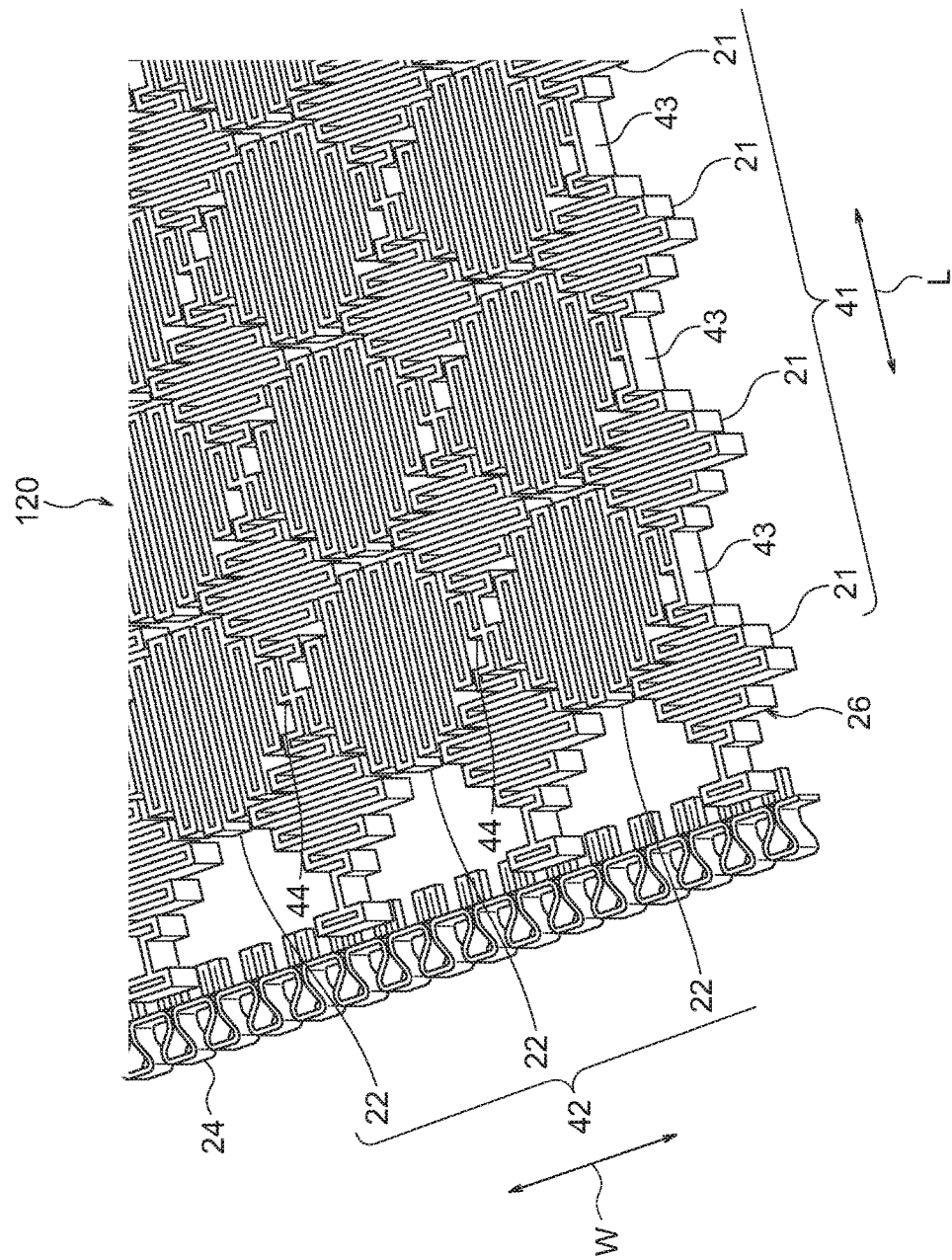
FIG. 21 is an enlarged view of section B of the wearing band illustrated in FIG. 20.

A wearing band 120 according to the fourth exemplary embodiment illustrated in FIG. 20 and FIG. 21 has a structure modified from that of the wearing band 20 (see FIG. 1) according to the first exemplary embodiment described above as follows.

Namely, in the wearing band 120 according to the fourth exemplary embodiment, the size of the second zigzag springs 22 is larger than that of the first zigzag springs 21. Further, the second zigzag springs 22 have a smaller spring constant than that of the first zigzag springs 21 due to the size of the second zigzag springs 22 being larger than that of the first zigzag springs 21.

Due to the second zigzag springs 22 having a larger size (smaller spring constant) than the first zigzag springs 21, the wearing band 120 according to the fourth exemplary embodiment is anisotropic in that the wearing band 120 stretches more readily in its width direction than in its length direction. Further, in the wearing band 120, the size of the second zigzag springs 22 is larger than that of the first zigzag springs 21, and so the wearing band 120 also has the property of readily bending about an axis parallel to its length direction.

The wearing band 120 according to the fourth exemplary embodiment is applied to a location on the body where it is possible to exploit its property of being anisotropic, in that the wearing band 120 stretches more readily in its width direction than in its length direction, and its property of readily bending about an axis parallel to its length direction.

According to the fourth exemplary embodiment, the wearing band 120 is made lightweight by including the plural first zigzag springs 21 and the plural second zigzag springs 22. Moreover, the second zigzag springs 22 having axial directions in the width direction of the wearing band 120 are larger in size (have a smaller spring constant) than the first zigzag springs 21 having axial directions in the length direction of the wearing band 120.

Thus, when the wearing band 120 is worn on the body, the wearing band 120 stretches readily in its width direction and the wearing band 120 bends readily about an axis parallel to its length direction. Further, the wearing band 120 also stretches in its length direction because of the first zigzag springs 21, such that even complicated undulations in the body can be accommodated As explained above, the wearing band 120 is not uncomfortable when worn on the body, since the wearing band 120 is flexible and conforms well to the complicated shape of the body. This enables the comfort of the wearing band 120 when worn on the body to be improved.

Note that in the fourth exemplary embodiment, the size of the second zigzag springs 22 is larger than that of the first zigzag springs 21, and so the spring constant of the second zigzag springs 22 is smaller than that of the first zigzag springs 21. However, the size of the second zigzag springs 22 may be configured to be smaller than or the same as the size of the first zigzag springs 21 so long as the spring constant of the second zigzag springs 22 is smaller than the spring constant of the first zigzag springs 21.

Further, the modified example of the first exemplary embodiment, the detachment section 71 of the second exemplary embodiment (see FIG. 16 and FIG. 17), and the conductive pattern 92 of the third exemplary embodiment (see FIG. 18 and FIG. 19) described above may be applied to the wearing band 120 according to the fourth exemplary embodiment.

Although explanation has been given regarding a first to fourth exemplary embodiment of technology disclosed herein, the technology disclosed herein is not limited to the above, and obviously various other modifications may be implemented within a range not departing from the spirit of the present invention.

All cited documents, patent applications and technical standards mentioned in the present specification are incorporated by reference in the present specification to the same extent as if the individual cited documents, patent applications and technical standards were specifically and individually incorporated by reference in the present specification.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wearing band for an electronic device, the wearing band comprising:
a plurality of first zigzag springs having axial directions in a length direction of a band body that is formed in a belt shape or a ring shape, the plurality of first zigzag springs being arrayed in the length direction and a width direction of the band body so as to form a section stretching and contracting in the length direction of the band body; and
a plurality of second zigzag springs having axial directions in the width direction of the band body and arrayed in the length direction and the width direction of the band body so as to form a section stretching and contracting in the width direction of the band body, the plurality of second zigzag springs having a spring constant different to a spring constant of the plurality of first zigzag springs.

2. The electronic device wearing band of claim 1, wherein the plurality of first zigzag springs and the plurality of second zigzag springs are formed in the same single plane extending in the length direction and the width direction of the band body.

3. The electronic device wearing band of claim 1, wherein:
the plurality of first zigzag springs form a plurality of first spring rows that are alongside each other in the width direction of the band body and that each include a plurality of the first zigzag springs arranged along the length direction of the band body;
the plurality of second zigzag springs form a plurality of second spring rows that are alongside each other in the length direction of the band body and that each include a plurality of the second zigzag springs arranged along the width direction of the band body; and
each of the plurality of second zigzag springs couples a coupling portion between adjacent first zigzag springs in one first spring row from out of the plurality of first spring rows to a coupling portion between adjacent first zigzag springs in another first spring row adjacent to the one first spring row from out of the plurality of first spring rows.

4. The electronic device wearing band of claim 3, wherein a mounting section to which an electronic device body is mounted is formed to the band body.

5. The electronic device wearing band of claim 4, further comprising a detachment section that is provided to the mounting section and that attaches and detaches the electronic device body.

6. The electronic device wearing band of claim 4, further comprising a conductive pattern that is formed to the band body and that is electrically connected to the electronic device body.

7. The electronic device wearing band of claim 1, wherein:
the band body has a belt shape;
a connection section is formed at one length direction end of the band body; and
a connected section to which the connection section connects is formed at the other length direction end of the band body.

8. The electronic device wearing band of claim 1, wherein the band body has a ring shape.

9. The electronic device wearing band of claim 1, wherein the first zigzag springs and the second zigzag springs are configured in a plate shape that runs along the length direction of the band body and the width direction of the band body.

10. The electronic device wearing band of claim 1, wherein the spring constant of the first zigzag springs is smaller than the spring constant of the second zigzag springs.

11. The electronic device wearing band of claim 1, wherein the spring constant of the second zigzag springs is smaller than the spring constant of the first zigzag springs.

12. The electronic device wearing band of claim 1, wherein the size of the first zigzag springs is different to the size of the second zigzag springs.

13. The electronic device wearing band of claim 1, wherein the outline profiles of the first zigzag springs and the second zigzag springs are regular octagonal shapes or circular shapes in plan view.

14. The electronic device wearing band of claim 1, wherein line elements forming the first zigzag springs and the second zigzag springs are plate shaped or rounded rod shaped.

15. An electronic device comprising:
an electronic device body; and
a wearing band to which the electronic device body is mounted;
the wearing band including
a plurality of first zigzag springs having axial directions in a length direction of a band body that is formed into a belt shape or a ring shape, the plurality of first zigzag springs being arrayed in the length direction and a width direction of the band body so as to form a section stretching and contracting in the length direction of the band body, and
a plurality of second zigzag springs having axial directions in the width direction of the band body and arrayed in the length direction and the width direction of the band body so as to form a section stretching and contracting in the width direction of the band body, the plurality of second zigzag springs having a spring constant different to a spring constant of the plurality of first zigzag springs.

* * * * *